Patented Feb. 12, 1929.

1,701,580

UNITED STATES PATENT OFFICE.

JEAN MATTI, OF PULLY, SWITZERLAND, ASSIGNOR TO AUGMENTINE HOLDING S. A., OF LAUSANNE, SWITZERLAND.

PROCESS FOR THE MANUFACTURE OF ORDINARY BREAD.

No Drawing. Application filed June 25, 1927, Serial No. 201,562, and in Great Britain June 25, 1926.

The present invention relates to a process for the manufacture of ordinary bread. This process permits of bread being always obtained of the best quality and at a higher yield, while at the same time reducing by half the time of manufacture required by the processes at present employed.

It has previously been proposed in connection with the manufacture of bread to reduce the time required by making use of an emulsion consisting of water, animal or vegetable fat, sugar and powdered milk, which emulsion was mixed with the flour, salt, yeast and additional water.

It has also been proposed to employ about 1% of shortening calculated on the weight of the flour, on a process of manufacturing bread wherein a starch degradation product and malt extract were mixed with the flour, water, yeast and salt, the baking being for a shorter time than usual.

Furthermore, it is known to mix the dough ingredients in the manufacture of ordinary yeast-leavened bread so that the resulting dough batch had a temperature of not less than 88° F., and to transfer the batch directly to the divider without allowing any dough-time period.

It is also known to add about ½% cotton seed oil (calculated on the weight of the flour) to the dough ingredients of yeast-leavened bread, said ingredients including flour, water, sugar, salt and compressed yeast.

The present invention, however, comprises a process for making ordinary bread wherein 100 parts of flour, 66.5 parts of water, 2 parts of salt and 1 part of yeast are intimately mixed at a temperature of from 38 to 40 degrees C. (100 to 102 degrees F.), 0.1 parts of an edible neutral fatty substance such as refined paraffin oil are added, and the mass is mechanically kneaded for about 12 minutes, after which it is allowed to ferment for 400 minutes approximately, before the moulding and rising of the bread in the pans which operation takes 15–30 minutes and is followed by removal to the oven and baking for 1 hour.

It should be noted that according to this process there is no preliminary preparation of the yeast.

After fermentation the dough is moulded and allowed to rise in pans which operation takes from 15 to 30 minutes. The bread is then placed in the oven and baking is stopped at the end of about one hour.

The total duration of the panification described is about two hours and a half to three hours.

If the bread taken from the oven be weighed it will be found that the yield is about 7.5 per cent higher than that of the bread obtained by the ordinary processes of manufacture. This yield is attained with stale flour about a month old as well as with fresh flour straight from the mill. If the bread be weighed at the end of 24 hours the yield will be found to have diminished again by about 0.5 per cent, so that it may be said that the mean yield is at the least 6 per cent higher than that obtained by the known processes.

It will also be noticed that when stale the bread manufactured according to this process does not taste of the yeast which is a characteristic feature of the rapid processes of manufacture at present employed. This fact constitutes an important improvement in the quality of the bread manufactured according to the process which forms the subject matter of this invention.

Having now particularly described and ascertained the nature of my said invention and in what manner the same is to be performed, I declare that what I claim is:—

A process for the manufacture of bread which comprises intimately mixing 100 parts of flour, 66.5 parts of water, 2 parts of salt and 1 part of yeast at a temperature of from 38 to 40° C. adding 0.1 parts of an edible neutral fatty substance, mechanically kneading the mass, allowing it to ferment, molding the bread and allowing it to rise and thereafter baking the bread for about one hour.

In testimony whereof I have signed my name to this specification.

JEAN MATTI.